United States Patent

Lohde et al.

[11] Patent Number: 5,860,715
[45] Date of Patent: Jan. 19, 1999

[54] EQUIPMENT ENCLOSURE

[75] Inventors: Dan Lohde, Aliso Viejo; Noorlah N. Beidokhti, Huntington Beach; Brian J. Smith, Laguna Niguel; Jeff L. Tipton, Laguna Niguel, all of Calif.

[73] Assignee: The Toro Company, Riverside, Calif.

[21] Appl. No.: 818,740

[22] Filed: Mar. 14, 1997

[51] Int. Cl.⁶ .................................................. A47B 81/00
[52] U.S. Cl. .................... 312/287; 312/328; 312/284; 312/100; 220/210; 220/677; 174/50
[58] Field of Search ....................... 312/100, 284, 312/287, 310, 324, 327, 328, 223.1, 223.5, 223.6, 265.1, 265.2, 265.3, 265.4, 265.6, 215; 220/3.2, 3.7, 3.8, 210, 677, 692, 693, 504, 526; 174/50; 361/622, 641, 659, 664; 292/109, 110, 114, 44

[56] References Cited

U.S. PATENT DOCUMENTS

| | | |
|---|---|---|
| D. 237,503 | 11/1975 | Langmack Jr. . |
| D. 366,458 | 1/1996 | Pearson et al. . |
| D. 367,915 | 3/1996 | Daugherty . |
| 904,740 | 11/1908 | Walker .................. 312/328 X |
| 1,447,145 | 2/1923 | Morell . |
| 2,385,738 | 9/1945 | Stanton .................. 312/287 X |
| 2,598,957 | 6/1952 | Wolfe ....................... 312/100 |
| 2,740,684 | 4/1956 | Haralson ............. 312/223.5 X |
| 3,342,537 | 9/1967 | Nelson et al. ............. 312/100 |
| 3,868,040 | 2/1975 | Langmack Jr. et al. . |
| 4,003,610 | 1/1977 | Main . |
| 4,225,201 | 9/1980 | Davis ................... 312/284 X |
| 4,327,530 | 5/1982 | Bush ..................... 220/3.8 X |
| 4,435,027 | 3/1984 | Prather et al. . |
| 4,644,095 | 2/1987 | Bright et al. .............. 174/50 |
| 5,476,316 | 12/1995 | Batroney et al. . |

FOREIGN PATENT DOCUMENTS

| | | | |
|---|---|---|---|
| 252087 | 2/1927 | Italy ....................... 361/622 |

*Primary Examiner*—Jose V. Chen
*Assistant Examiner*—Janet M. Wilkens
*Attorney, Agent, or Firm*—Richard L. Myers

[57] ABSTRACT

An enclosure for housing electronic controls and devices that provides exceptional access to all sides of the enclosure and is both secure and aesthetically pleasing. The enclosure has a frame, semi-cylindrical doors, a top assembly, and a mounting base. Each of the doors has a door retaining member on its inner lower surfaces which engages and is supported by a receiving member mounted to a lower portion of the frame. The doors may be pivoted open and closed about the retaining and receiving members or may be completely removed from the base by simply lifting the doors off of the frame. Removal of the doors allows unobstructed access to the interior of the enclosure. The top assembly mounts on top of the frame and moves between a closed position and an open position. The top assembly includes a rim which overlaps and engages the top surfaces of the doors to securely retain the doors in the closed position. An opening and closing system mounted on the frame supports the top assembly in the open position. The enclosure is further provided with a lock to secure the top and doors in the closed position and prevent tampering by unauthorized persons.

12 Claims, 3 Drawing Sheets

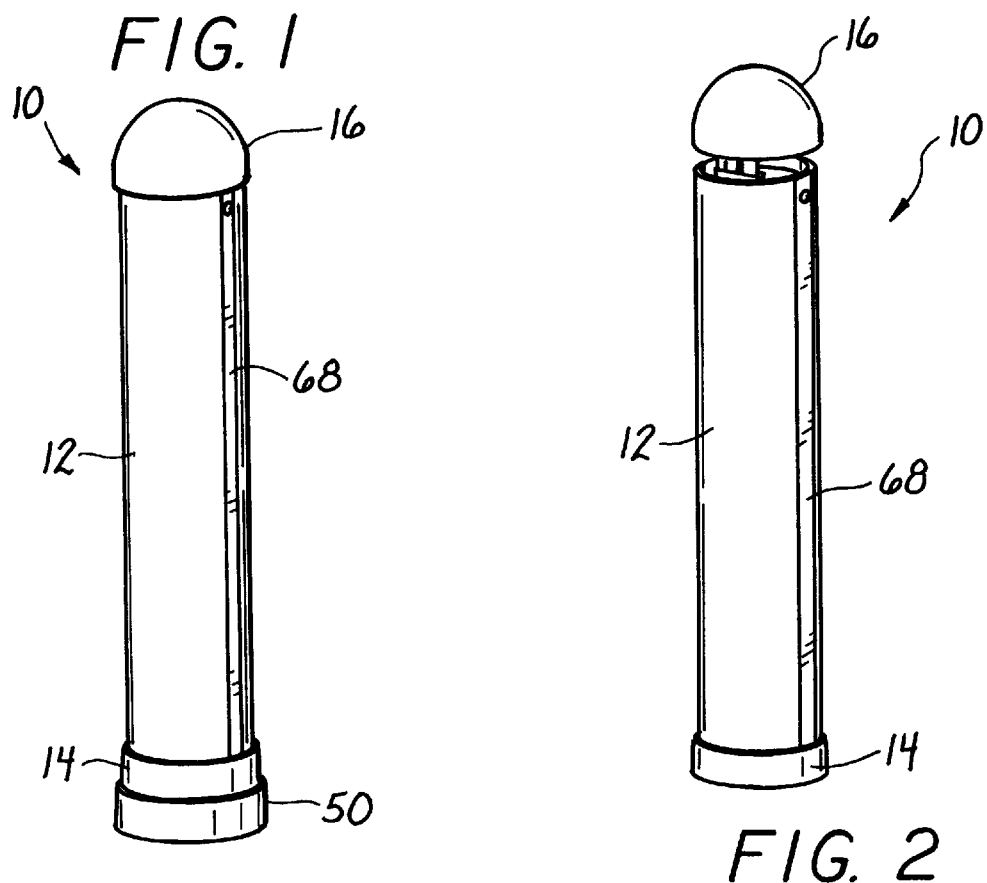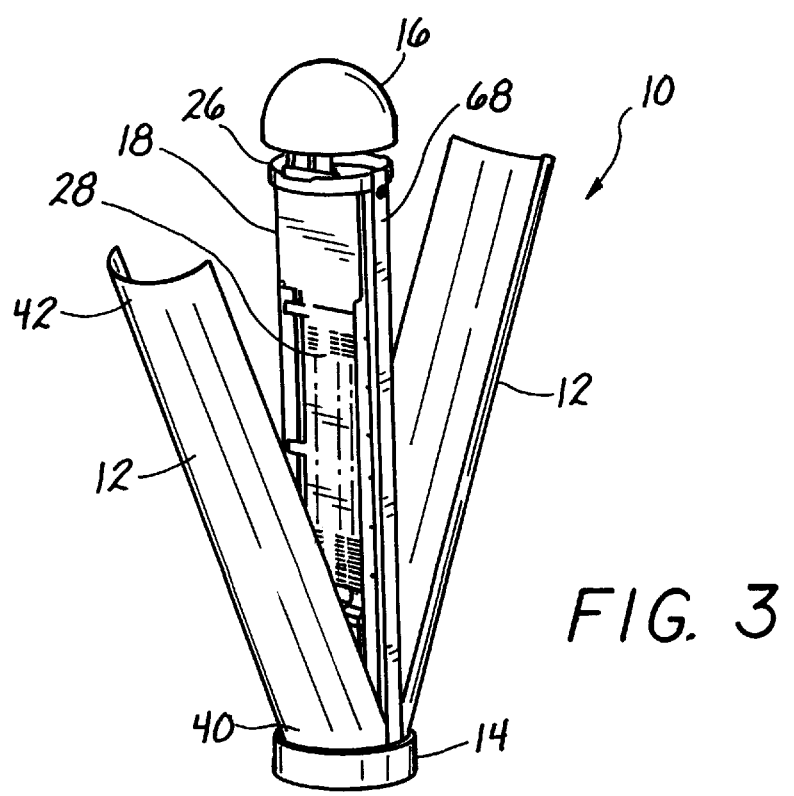

EQUIPMENT ENCLOSURE

FIELD OF THE INVENTION

This invention relates generally to enclosures, and more particularly, to pedestal enclosures for electronic equipment and irrigation controls.

BACKGROUND OF THE INVENTION

This invention concerns an improved enclosure of the type adapted for exterior and above ground applications. Such enclosures are particularly useful for containing and protecting electronic devices and other equipment. In addition, such enclosures are useful for housing irrigation controllers and devices as well as for electrical and plumbing connections and splices. Enclosures of this type are also used as terminal housings for communication, power or other types of cables.

It is common in irrigation systems to utilize such enclosures to house the controls and controllers for the various equipment required throughout an irrigated area. Such irrigation controls may include electronic controllers including radio controllers, and antennas, circuit boards, valve modules, control transformers, and the associated wiring and splices.

It is also common to use multiple enclosures to house the required equipment necessary to control the irrigation of large or multiple areas. Having access to all of the components and wiring during installation or servicing of such enclosures is of extreme importance, due to the small size of the equipment and the significant amount of wiring involved. However, typical enclosures of this type have a front door that swings open, only allowing access to the front of the enclosure. Further, the doors cannot easily be removed, which further restricts access to the enclosure interior.

Examples of such enclosures includes a pedestal-type enclosure. This type of enclosure generally requires the installer or service person to bend over or down during servicing. The need for the service person to bend down while working can be quite strenuous. Limited access within these generally narrow pedestal-type enclosures amplifies the problem which also increases the time necessary to install or service such enclosures. Thus, there is a need for a pedestal enclosure which is easily serviceable and has good ergonomic access for organized and quality installment and maintenance.

Many of the existing pedestal-type enclosures which are utilized for irrigation applications have rectangular shapes with associated sharp corners and edges which can cause injuries when installed in locations that are accessible to the public. Thus, it is desirable to have an enclosure without sharp edges and corners.

Additionally, typical irrigation enclosures use spot and/or seam welded steel panels to form the enclosure. These welds weaken long-term corrosion resistance, particularly when using cost effective mild steels which are exposed to high moisture levels. Thus, there is a need for an enclosure that can be manufactured cost effectively and is corrosion resistant.

An additional problem with irrigation enclosures is the difficulty in aesthetically blending them with the landscaped environment. In an attempt to produce an aesthetically pleasing environment, landscape designers generally attempt to locate these enclosures in or around bushes, trees or other available hiding places. Hiding the enclosures also provide increased security against vandalism and unauthorized tampering. However, when using multiple enclosures distributed throughout a particular area, often termed satellite controllers, the enclosures are commonly placed directly out in the landscape. This is because of the limited hiding places and because hiding enclosures may further restrict access by service personnel. Thus, there is a need for an enclosure which is appealing and blends in with the surrounding landscaping and is effectively secure against vandalism.

For the foregoing reasons, there is a need for a cost effective enclosure which can house electrical and irrigation controls, provide access to all sides of the enclosure, an enclosure which is ergonomically designed, corrosion resistant, secure against vandalism, and which blends well in a landscaped area.

SUMMARY OF THE INVENTION

The present invention satisfies the need for an enclosure which can be used to house irrigation controls or other devices and which provides access to all sides of the enclosure by providing a pedestal type enclosure that has doors which may easily be removed. The doors generally surround the entire pedestal such that their removal exposes all sides of the enclosure and provides unrestricted and ergonomic access to internal equipment and wiring.

The enclosure of the present invention also provides a corrosion resistant container that blends well in a landscaped area, is compact, has a small radial footprint and mimics a walkway light post. In the fully closed position, the enclosure assembly is a simple and appealing pedestal or post design that has no hinges, doors or sharp edges. The enclosure assembly can be fully disassembled in a few seconds by removing the opposing doors, allowing a full 360 degree access to the internal components. Having access to all sides, allows enclosure assemblies of the present invention to be generally smaller than their previous counterparts. Additionally, by not using spot or seam welds on the exterior surface members as well as sharp corners or edges, corrosion resistance, safety and aesthetic appeal is improved.

A pedestal enclosure having the features of the present invention includes a frame having a plurality of side members and a plurality of generally opposing doors mounted on the frame. Each of the doors has an upper end and a lower end and at least one of the doors is pivotal on and removably connected to the frame at the lower end of the door. The enclosure also has a base which has a base plate for supporting the frame and a top attached to said frame.

In another aspect of the present invention, the enclosure includes a frame which has two side members, and bottom and top cross members which connect the two side members. A pair of opposing semi-cylindrical doors are mounted on the frame. Each of the doors has an upper end and a lower end. The lower end of each door is pivotal on and removably mounted to the frame. A cylindrical base, which has a base plate and an upwardly extending cylindrical wall, supports the frame and the doors. The cylindrical base has a larger diameter than the semi-cylindrical doors such that the doors are retained within the upwardly extending cylindrical wall.

A top is mounted on the frame and is movable between an open position and a closed position. The top has a dome shaped outer surface mounted on an outer ring which has a slightly larger diameter than the diameter of the doors. This configuration allows the top to cover and retain the doors when the top and the doors are in the closed position.

The top may also have a mechanism for opening and closing the enclosure. This mechanism includes a shaft attached to the top which is movably mounted on the frame. The shaft is supported by a support bearing which holds the top in the open position and also restricts movement of the top to a linear path between the open and closed positions. The support bearing is spring loaded and the shaft has detent positions to hold the top in the open and closed positions.

Each of the enclosure doors has an inner surface and an outer surface. A door retaining member is mounted on and extends from the lower end of each inner surface. A door receiving member is attached to the frame for receiving the door retaining members. Outer side strips are provided along the side members of the frame and overlap the edges of the closed doors. The side strips provide increased security from vandalism.

In another aspect of the present invention, the enclosure has a lock for securing the top and the doors in the closed position. The lock, which can be of the cylinder type, is mounted to the frame, and engages a locking block attached to the top when the top is in the closed position. When closed, the enclosure assembly is designed to withstand vandalism and tampering by unauthorized persons. The concern for prying or bending the doors open is eliminated by the side strips which overlap the closed doors.

In another aspect of the present invention, the base plate is mounted on a ground engaging member. The ground engaging member is a circular base that securely supports the enclosure. Both the base plate and the ground engaging member have passageways for wiring and conduit.

In yet another aspect of the present invention, the outer surface of the top is made from a translucent material. A light may be mounted on a top plate which is located within the top and the light is wired to the controller. The controller may be programmed to activate the light on a timed, schedule during servicing or other needs.

The invention, together with additional features and advantages thereof, may be best understood by reference to the following description taken in conjunction with the accompanying illustrative drawings.

BRIEF DESCRIPTION OF THE DRAWINGS

FIG. 1 is a perspective view of an enclosure formed in accordance with the principles of the present invention;

FIG. 2 is a perspective view of the enclosure of FIG. 1 showing the top in the open position;

FIG. 3 is a perspective view of the enclosure of FIG. 1 showing the top in the open position and the doors in an open position;

DESCRIPTION OF THE PREFERRED EMBODIMENTS

Figure 4:
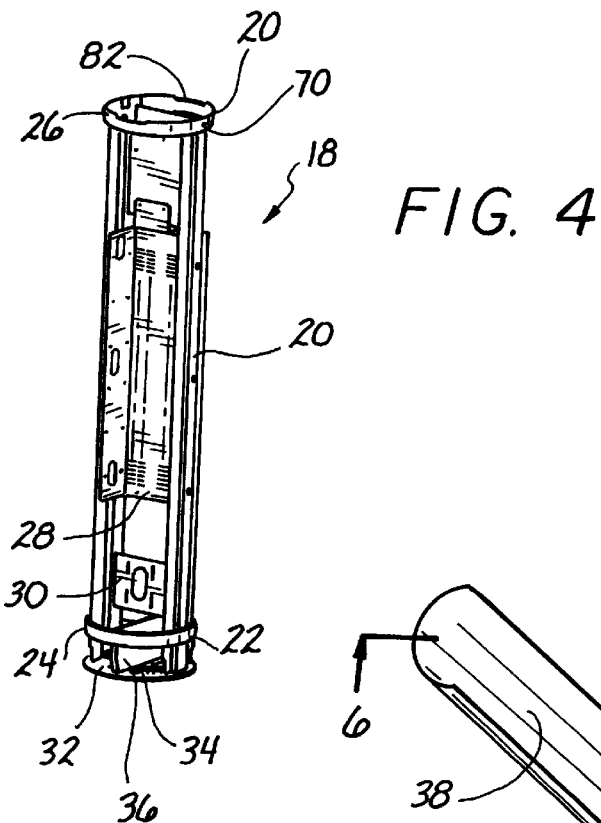
FIG. 4 is a perspective view of the frame assembly of the enclosure of FIG. 1.

An enclosure assembly is illustrated in FIGS. 1–3 and designated generally by the reference numeral 10. The enclosure assembly 10, which is particularly adapted to house electronic devices and components, preferably includes a plurality of doors 12, a base 14 and a top 16. The doors 12 are generally mounted on a frame assembly 18 such that they can be pivoted open or closed. The base 14 generally supports the frame assembly 18. The enclosure 10 is generally pedestal or post shaped and preferably has a cylindrical or other rounded cross section. However, the enclosure 10 generally may be of any cross sectional shape.

Referring now to FIG. 4, the frame assembly 18 provides structural integrity for the enclosure assembly 10. The frame assembly 18 is generally designed to be corrosion resistant and to withstand the abuse common in public installations. The frame assembly 18 has a plurality of side members 20, and at least one cross-supporting member 22. The cross supporting members 22 may include a bottom ring 24 and a top ring 26 which are connected to the side members 22. The frame assembly 18 preferably includes two opposing side members 20. However, additional side members 20 may be used, particularly when using more than two doors 12. The side members 20 are generally individual frame pieces but may protrude as outer edges of a single formed piece.

Additional shear strength and rigidity may be obtained through the use of additional cross-members 22 or by attaching mounting plates 28 to the frame assembly 18. The mounting plates 28 may also be connected to side members 20 and act as a web portion of the generally I-beam shaped frame 18. The quantity, configuration and type of mounting plates 28 may be adapted for each particular installation and may also include a mounting bracket 30. For example, devices such as electronics, wiring, printed circuit, assemblies, controllers and associated wiring and conduit may need to be supported by such mounting plates 28 and mounting brackets 30. Mounting plate 28 may be fastened in a modular to facilitate manufacture and fashion flexibility in the field.

The frame assembly 18 may also include a bottom plate 32 which is attached to and supports a lower end of the side members 20. This attachment may be accomplished by welding or through the use of fasteners. However, any means of fastening the side members 20 to the bottom plate 32 may be used. The bottom plate 32 may be advantageously provided with a hole or holes 34 to promote an organized passing of cables, wires, conduit and the like.

A door receiving member 36 is mounted to the frame assembly 18 for use in rotatably retaining the doors 12. The door receiving member 36 may include a pair of plates that define a slot or a plurality of slots. The slot engages a portion of each door 12, such that each door 12 is pivotally coupled to the frame assembly 18. The door receiving member 36 may be attached to the bottom plate 32. As shown in FIG. 4, the receiving member 36 may include a single slot that extends across the bottom plate 32. This single slot configuration is particularly useful when using a pair of opposing doors 12.

Figure 5:
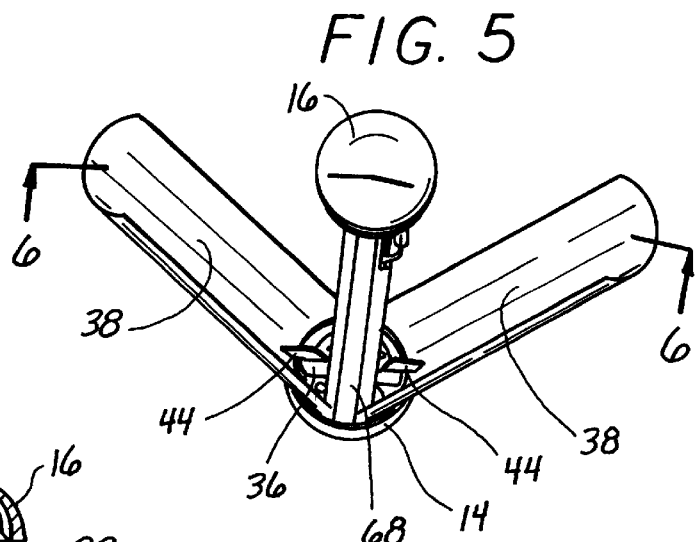
FIG. 5 is a perspective view of the enclosure of FIG. 1 showing the doors opened.
Figure 6:
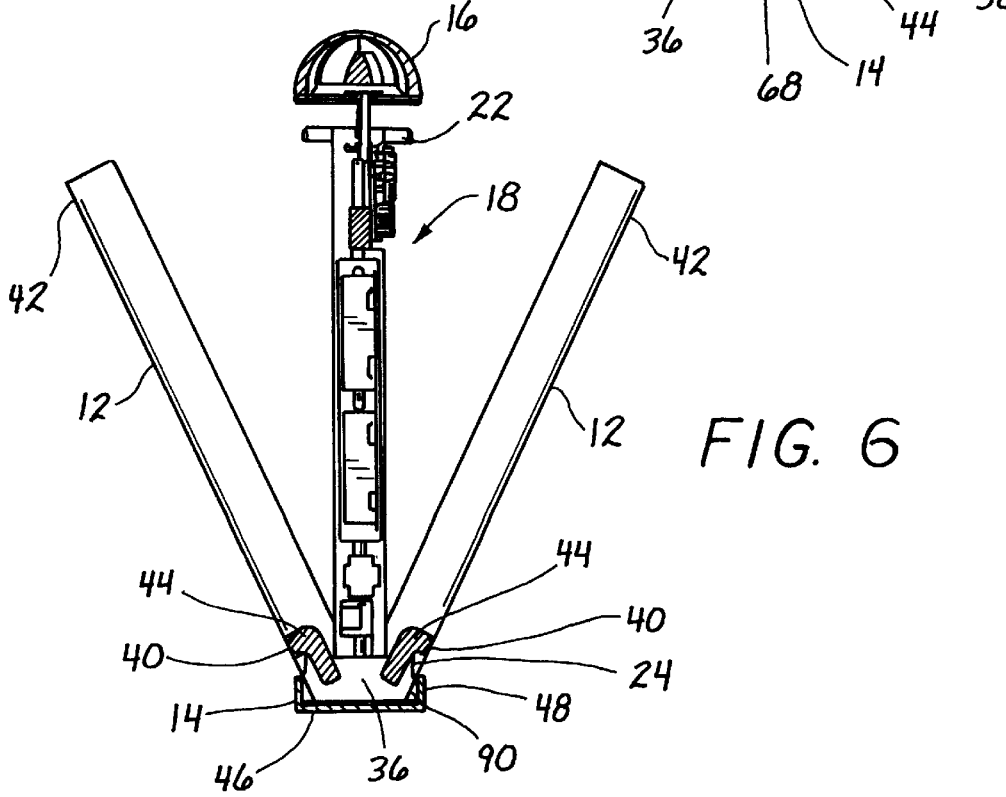
FIG. 6 is a cross sectional view along lines 6—6 of FIG. 5, showing the door retaining members.

Referring now to FIGS. 5 and 6, the plurality of doors 12 may preferably be a pair of similar, generally opposing, doors 12, each having an inner surface 38 and an outer surface. Each door 12 also has a lower end 40 and an upper end 42. The plurality of doors 12 may also include three or more generally opposing doors 12. The number of doors 12 may change depending upon the desired style and cross sectional shape of the enclosure assembly 10. Each of the plurality of doors 12 preferably has a rounded, such as circular, cross-sectional shape. For example, in the illustrated embodiment, each of the two doors 12 has a semi-cylindrical shape.

In order to removably attach each door 12 to the frame assembly 18 or base 14, a door retaining member 44 is attached to the inner surface 38 of each rotatable door 12. The door retaining member 44 may be a thin L-shaped piece of metal, plastic or other structural material that extends inwardly from the lower end 40 of the door 12 and into the frame assembly 18. It will be understood, however, that the door retaining member 44 can be of most any shape that is movable within the door receiving member 36.

Each door retaining member 44 slidably fits inside the receiving member 36 on the frame 18 such that each door 12 is pivotally supported by the frame 18. The L-shaped portion of the door retaining member 44 engages the top of the bottom ring 24 which act to retain each door retaining member 44 and to support sideways motion of each door 12 in an open position. Each door 12 is supported in the open position by an undercut 90 in the door receiving member 36, as well as the top of the base 14. By adjusting the angle of the undercut 90, one can change the angle that each door 12 is held open by the door receiving member 36 and the base 14.

Each of the door retaining members 44 may preferably be configured such that each of the doors 12 may be pivoted opened from a closed door position into two separate open door positions. The open positions may include a single open position, or a first open door position and a second open door position. Alternatively, each of the plurality of door retaining members 12 may be configured such that each of the plurality of doors 12 may have any number of open door positions.

The closed door position is shown in FIG. 1&2. The bottom ring 24 may be attached to the side members 20 at the top end of the receiving member 36. This prevents each door 12 from being removed without first lifting the retaining member 44 of the door 12 over the bottom ring 24 and out of the receiving member 36.

Alternatively, each door 12 may also be pivotally coupled to the frame assembly 18, or alternatively, to the base 14, by other methods well known to those skilled in the art. Such methods may include the use of hinges, flexible members, and similar apparatus which are mounted to the lower end 40 of each door 12 and also to the lower portion of the frame assembly 18 or the base 14.

If a rectangular or other configuration of pedestal enclosure (not shown) is desired, the doors 12 may be provided with the desired shape. Thus, an enclosure assembly having a rectangular rear portion and a semi-circular front portion may utilize a rectangular rear door and an opposing semi-cylindrical front door. Additionally, doors may be as generally described above with the exception that at least one of the doors may be a fixed door or panel that is rigidly fixed to the frame assembly. At least one of the doors may include variations such as handles or cutouts or stylistic differences. The plurality of doors 12 may each be fitted with an adjustable opener (not shown) such as a hydraulic piston, or a spring type or motorized opener.

Referring back to FIG. 1 and to FIG. 6, the base 14 generally includes a base plate 46 and an upwardly extending wall 48. In a preferred embodiment, the base 14 is cylindrical and includes a cylindrical base plate 46 and an upwardly extending cylindrical wall 48 for supporting an locking the doors 12. The upwardly extending wall 48 may have a slightly larger diameter than the doors 12 such that the doors 12 and frame assembly 18 are retained within the inner side of the wall 48. Thus, the base 14 generally has a similar shape as the exterior shape of the enclosure assembly 10. The base plate 46 may have a passageway or passageways for cables, wires, plumbing and the like and such passageways may be in communication with the holes 34 in the bottom plate 32.

A ground engaging member 50 may be used to securely support the enclosure assembly 10 on the ground. In one embodiment, the enclosure assembly 10 is mounted on a ground engaging member 50 through fasteners such as bolts, studs, or rivets, or through welding, or any other means as is known in the art. The ground engaging member 50 may be a concrete base, a steel or wooden base structure or the like. Like the base plate 46, the ground engaging member 50 may also include passages for receiving wiring, cable, conduit or other such components.

The enclosure assembly 10 may also include an integral ground engaging member. Alternatively, the enclosure assembly 10 may be directly mounted on a sidewalk, pathway, or even partially buried in the ground.

Figure 8:
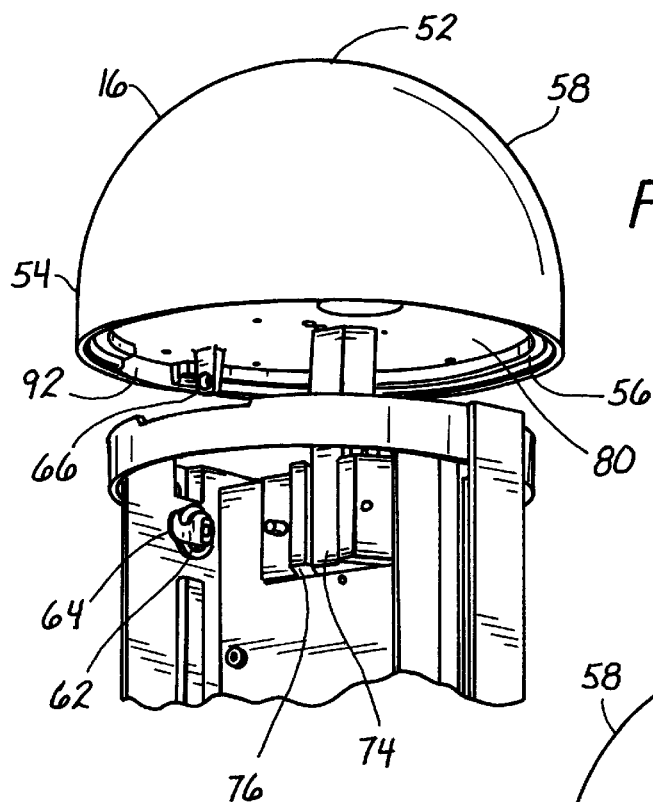
FIG. 8 is a perspective partial view of the enclosure of FIG. 1 showing the top in the open position.
Figure 9:
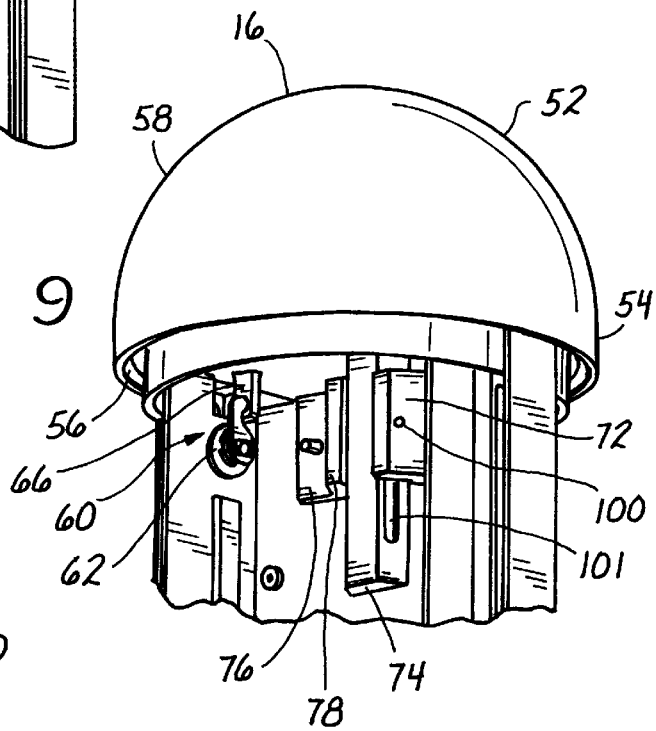
FIG. 9 is a perspective partial view of the enclosure of FIG. 1 showing the top in the closed position.

Referring now to FIGS. 8 and 9, the top assembly 16 is movably mounted on the frame assembly 18 so that it can be raised upwardly to an open position as shown in FIG. 8 or pressed down into a closed position as shown in FIG. 9. The top assembly 16 has an outer surface 52 which is attached to a mounting disc 80. The mounting disc 80 has an inner groove 56 on the lower surface of the mounting disc 80. The mounting disc 80 will typically have a diameter that is slightly larger than the outer diameter of the doors 12 such that the inner groove 56 overlaps and engages the upper end 42 of the doors 12 and retains each of the doors 12 when they are closed against the frame assembly 18. To open the doors 12, the top assembly 16 in this embodiment is raised to the open position.

The outer rim 54 may be an integral part of the outer surface 52 or may be an independent piece. By having a diameter that is larger that the exterior of the enclosure, the outer surface 52 and outer rim 54 act as a rain and water shield for the enclosure assembly 10. The outer rim 54 cosmetically covers the top of the side strips 68 in the slotted area 92. In the closed position, the slotted area fits around the side strips 68 to prevent undesirable rotation and to keep the unit locked.

The outer surface 52 may have a semi spherical or dome shape. This dome shape allows for quick water run off and provides a generally pleasing appearance. The dome shape may be a perfect semi-spherical dome or it may be provided with other rounded configurations for aesthetics. Additionally, the dome shaped outer surface 52 provides a full radius antenna cover that supports a multitude of different antenna shapes without changing the exterior look of the enclosure assembly 10. However, the outer surface 52 may be a flat, angled, or otherwise shaped to facilitate water run off.

The top assembly 16 may also include a light source 58 which is particularly useful if the outer surface 52 or a portion thereof is made from a translucent material, such as a plastic or glass. Alternatively, or in combination, the outer surface 52 or outer rim 54 may have downwardly facing vents that allow the escape of light without allowing the ingress of water. Plastic, glass or other translucent materials may also be used on areas such as the doors 12 or the base 14. The locations, size and styles of the source 58 can vary considerably light as long as the heat from the light 58 is allowed to disperse and water is prevented from entering the enclosure. In essence, the enclosure assembly 10 may be configured to look like and function as a lighted post in order to enhance its appearance and safety in night applications.

The light 58 may be a low voltage, high efficiency light that is compatible with the typical voltages used with irrigation or other controllers. However, the light may be supplied in any intensity, voltage, color, or style desired.

In conjunction with the light 58 as described above, a lighting on/off or flashing ability may be provided as a means to identify and locate a particular enclosure assembly 10 or to provide a unique appearance. This is particularly useful when a number of satellite enclosures are being installed or serviced and especially during the evening or night. Specific timing sequences as well as enclosure identification patterns may be programmed into a main controller that communicates with each of the satellite enclosures. Alternatively, each enclosure may be fitted with its own light controller and timer.

A method for identifying at least one of a plurality of satellite enclosures, such as an enclosure having the features of the present invention, may include providing an electronic controller for controlling the lights in each of the enclosures which have lights. The lights may then be selectively lit at the desired enclosure such that an individual enclosure may be easily located as well as distinguished from the remaining enclosures. The lights may also be selectively flashed to further distinguish the desired enclosure. A main controller may also be programmed to light those enclosures which are currently active and controlling equipment. Differing lighting schemes may also be used to create an aesthetic environment which fits the landscaped area.

Again, referring to FIGS. 8 and 9, a lock assembly 60 may be provided to securely lock the enclosure assembly 10 in the closed position. The lock assembly 60 may include a locking cylinder 62, an engaging hook 64 and a locking block 66. However, any method of locking the enclosure assembly 10 or securing the top assembly 16 in the down position, as is understood by those skilled in the art, may be used.

The locking cylinder 62 may include any exterior grade locking device such as a key lock or the like. The locking hook 64 may be attached to the locking cylinder 62 such that it rotates with the locking cylinder 62. The locking block 66 may be fitted with an engagement portion and may be attached to an inside portion of the top assembly 16.

The enclosure assembly 10 may be opened by rotating the locking cylinder 62, which rotates the locking hook 64. This disengages the locking hook 64 from the locking block 66. The top assembly 16 may then be lifted upwardly and the doors 12 opened.

Referring back to FIGS. 1–3, side strips 68 may be provided on the frame assembly 18. The side strips 68 are generally narrow lengths of structural material, such as a metal or a plastic, which run alongside each side member 20. Each side strip 68 may be attached to the bottom and top rings 24 and 26 such that they extend along the entire length of the frame 18, outwardly of each side member 20.

Each side strip 68, in conjunction with the associated side member 20, defines a slot or overlap portion such that each door 12 fits into the slot or is overlapped by the side strip 68 when the door 12 is in the closed position. Thus, the side strips 68 overlap the closed doors 12 and act as a tortuous path for water spray and rain, as well as provide increased security.

Figure 7:
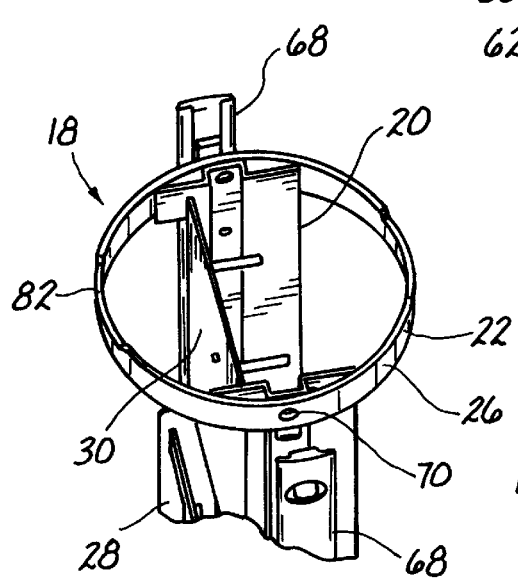
FIG. 7 is a perspective partial view of the enclosure FIG. 1 showing an upper portion of the frame.

Referring now to FIG. 7, vents 70 may be provided in the frame assembly 18 for venting the interior of the enclosure assembly 10. The vents 70 may be holes in the side members 20 which are generally hidden by the side strips 68. When in the closed position, the doors 12 overlap the doors 12 and the vents 70 so that direct water spray is prevented from entering inside the enclosure assembly 10.

An opener 72 may be provided to support the opening and closing of the top assembly 16, as illustrated in FIGS. 8 and 9. The opener 72 may include a support bearing 76, a shaft 74, and means for supporting the shaft 78 in a fixed position within the support bearing 76. The shaft may be attached at one end to the mounting disc 80 which is attached to the top assembly 16. The other end of the shaft 74 is movable within the support bearing 76 mounted to the frame assembly 18. By lifting the top assembly 16 upwards, the shaft 74 slides in the support bearing 76.

The shaft 74 may be provided with two or more detents or other locking indentation, one for the down position and one for the up position. When the top assembly 16 reaches the upper position, a ball plunger may be used to engage the lower detent on the shaft 74. The ball plunger and detent 78 are configured to hold the entire top assembly 16 in the up position. The support bearing 76 in conjunction with the shaft 74 eliminates any sideways rotation of the shaft 74 which in turn allows the shaft 74 to be mounted off center. This off-center mounting is ideal for antennae installations and mounting flexibility. Other methods of supporting movement of the top assembly 16 in relation to the frame assembly 18, as are known to those skilled in the art, may also be used. A stop screw 100 or other lock may be provided to prevent removal of the top assembly 16 by engaging the slot 101. By unscrewing the stop screw 100, the top assembly 16 can be removed for easy access and servicing.

It is desirable that the enclosure assembly 10 be moisture and corrosion resistant, as well as resistant to vandalism. Thus, the enclosure assembly 10 may be made from a metal such as aluminum, mild steel, or even stainless steel. Other embodiments of the enclosure assembly 10 can be made from a plastic, a composite material, or a combination of such materials. Generally, spot and seam welds are not used on any of the exterior surfaces, and sharp edges and corners are eliminated by the configurations described herein. The doors 12, top 16 and frame assembly 18 are generally made strong enough to create a structurally secure enclosure 10 as well as to generally withstand vandalism and tampering.

To open the enclosure assembly 10, the top assembly 16 must first be unlocked and lifted to the raised or open position. Once raised, the inner groove 56 of the top assembly 16 disengages the upper end 42 of each door 12 and allows the doors 12 to be opened. The doors 12 may then be opened by gripping the upper end of the doors and pulling them outwards. Cutouts 82 may be provided on the top ring 26 to assist in grasping the closed doors. The door retaining members 44 which ride in the receiving slots 36 help guide the opening and closing action of the doors 12. The receiving member 36, in conjunction with the overlapping bottom ring 24, retains the doors 12 if the base 14 is removed or damaged. The doors 12 may be fully removed by lifting upwardly and outwardly from the frame assembly 18. Removing the doors 12 allows full access to the internal components within the enclosure assembly 10.

While this invention has been described with respect to various specific examples and embodiments, it is to be understood that the invention is not limited thereto and that it can be variously practiced within the scope of the following claims.

What is claimed is:

1. A pedestal enclosure having a fully accessible interior comprising:
    a frame having a pair of side members and at least one cross member for connecting said pair of side members;
    a pair of opposing doors each being pivotally and removably coupled to said frame at a lower end, said pair of doors being pivotal between a closed door position and an open door position;
    a base having an upwardly extending wall for supporting said frame and said pair of doors and for retaining said pair of doors within said wall;
    a top mounted on said frame over said pair of doors, said top being movably mounted between an open position and a closed position;
    a door receiving member attached to said frame; and
    a pair of door retaining members, each attached to one of said pair of doors for removably and pivotally supporting each of said doors.

2. The enclosure as recited in claim 1 wherein each said pair of door retaining members comprises a L-shaped member.

3. The enclosure as recited in claim 1 wherein the base further comprises a base plate in connection with said upwardly extending wall and wherein said base plate has at least one passageway.

4. The enclosure as recited in claim 1 further comprising a ground engaging member attached to said base.

5. The enclosure as recited in claim 1 further comprising a pair of side strips having a fixed relationship with said frame outwardly from each of said side members.

6. The enclosure as recited in claim 5 wherein each of said side strips overlaps at least a portion of each of said pair of doors when said pair of doors are in said closed door position.

7. The enclosure as recited in claim 1 further comprising an opening mechanism to facilitate moving said top between said open position and said closed position.

8. An enclosure as recited in claim 1 wherein the top is translucent.

9. An enclosure as recited in claim 1 wherein the top further comprises a light source.

10. A pedestal enclosure having a fully accessible interior comprising:
    a frame having a pair of side members and at least one cross member for connecting said pair of side members;
    a pair of opposing doors each being pivotally and removably coupled to said frame at a lower end, said pair of doors being pivotal between a closed door position and an open door position;
    a base having an upwardly extending wall for supporting said frame and said pair of doors and for retaining said pair of doors within said wall;
    a top mounted on said frame over said pair of doors, said top having a dome shape and being movably mounted between an open position and a closed position.

11. A pedestal enclosure having a fully accessible interior for housing irrigation control components comprising:
    a frame having a pair of generally vertical side members and a bottom and top ring connecting said pair of side members;
    a pair of opposing doors, each door being generally semi-cylindrical in cross-section and having a lower end and an upper end as well as an inner surface and an outer surface, each lower end having a door retaining member extending from said inner surface;
    at least one door receiving member mounted on said bottom ring plate for receiving each of said door retaining members such that each of said doors is pivotally and removably coupled to said frame;
    a base having a base plate and an upwardly extending generally cylindrical wall for supporting said frame and said pair of doors, said cylindrical wall being of a larger diameter than said semi-cylindrical doors for movably retaining said doors within said wall;
    a top movably mounted between an open position and a closed position on said frame, said top attached to an outer rim having a diameter slightly larger than the diameter of said pair of doors for overlapping and retaining said doors when said top is in said closed position; and
    a lock for securing said top in said closed position.

12. The enclosure as described in claim 11 wherein said frame further comprising mounting plates having a fixed relationship with said frame for supporting said irrigation control components.

* * * * *